(12) United States Patent
Donahue (10) Patent No.: US 9,069,606 B2
(45) Date of Patent: Jun. 30, 2015

(54) AUTONOMOUS APPLICATION-LEVEL AUTO-SCALING IN A CLOUD

(75) Inventor: James Donahue, Sunnyvale, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 313 days.

(21) Appl. No.: 13/466,789

(22) Filed: May 8, 2012

(65) Prior Publication Data

US 2014/0040885 A1 Feb. 6, 2014

(51) Int. Cl.
*G06F 9/455* (2006.01)
*G06F 15/173* (2006.01)
*G06F 9/48* (2006.01)
*G06F 9/50* (2006.01)

(52) U.S. Cl.
CPC ............ *G06F 9/485* (2013.01); *G06F 9/45558* (2013.01); *G06F 2009/45575* (2013.01); *G06F 9/5083* (2013.01)

(58) Field of Classification Search
None
See application file for complete search history.

(56) References Cited

U.S. PATENT DOCUMENTS

| 8,219,684 | B1* | 7/2012 | Dean | 709/226 |
| 2009/0241030 | A1* | 9/2009 | von Eicken et al. | 715/735 |
| 2009/0293056 | A1* | 11/2009 | Ferris | 718/1 |
| 2011/0131335 | A1* | 6/2011 | Spaltro et al. | 709/228 |
| 2011/0258621 | A1* | 10/2011 | Kern | 718/1 |
| 2012/0137001 | A1* | 5/2012 | Ferris et al. | 709/226 |
| 2012/0239739 | A1* | 9/2012 | Manglik et al. | 709/203 |
| 2013/0174146 | A1* | 7/2013 | Dasgupta et al. | 718/1 |
| 2013/0179289 | A1* | 7/2013 | Calder et al. | 705/26.3 |

\* cited by examiner

*Primary Examiner* — Tammy Lee
(74) *Attorney, Agent, or Firm* — Shook, Hardy & Bacon L.L.P.

(57) ABSTRACT

A method and system for application-level auto-scaling in a cloud computing environment is provided. An example system includes a data collector and a scaling module. The data collector is to collect application-level data that reflects demand for a subject computing application executing on the virtual instance of a machine provided by a virtualization service. The scaling module is to select a scaling action based on the application-level data and issue a request to perform the scaling action with respect to the virtual instance of a machine.

18 Claims, 5 Drawing Sheets

AUTONOMOUS APPLICATION-LEVEL AUTO-SCALING IN A CLOUD

TECHNICAL FIELD

This application relates to the technical fields of software and/or hardware technology and, in one example embodiment, to system and method for application-level auto-scaling in a cloud computing environment.

BACKGROUND

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud. A web service that provides resizable compute capacity in a cloud may be referred to as a virtualization service. An example of a virtualization service is Amazon Elastic Compute Cloud (Amazon EC2). A cloud computing approach may be used to implement a variety of computational paradigms, such as virtual machines, jobs, remote procedure calls, traditional servers, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system that provides application-level auto-scaling in a cloud computing environment is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

In a cloud-based architecture, the number of servers providing a service via a web-based computing application as the load changes may be scaled automatically. In the case of a service that is invoked by clients over the Internet, a load balancer that fields and distributes incoming requests may be configured to monitor traffic and use this information to add or remove virtual instances hosting the service as the load changes. In the case of a service that is only used internally (for instance, a thumbnail service that gets invoked as new content arrives at the content server executing on a virtual instance of a machine), the cloud infrastructure can monitor some basic aspects of content server performance (CPU and memory utilization, for example) and use this data as an indication of the need to scale service instances. The approach that utilizes a load balancer only deals with external-facing services, while in a large multi-component service most of the work is likely to be done by internally-facing services that never get invoked through a load balancer. This approach of monitoring performance in order to determine the need for scaling uses information that is at best a proxy for real information about service requirements, because, e.g., a server can show high CPU utilization for many reasons, most of them insufficient to require launching new virtual instances.

A method and system described herein, that provides auto-scaling in a cloud computing environment, uses application-level data to make scaling decisions. In one example embodiment, a cloud-scale system is composed of a collection of virtual instances of a machine also referred to as 'virtual instances' or merely 'instances'). In one example embodiment, in an architecture comprising virtual instances executing respective server applications, each instance is provided with a so-called auto-scaling component.

Figure 1:
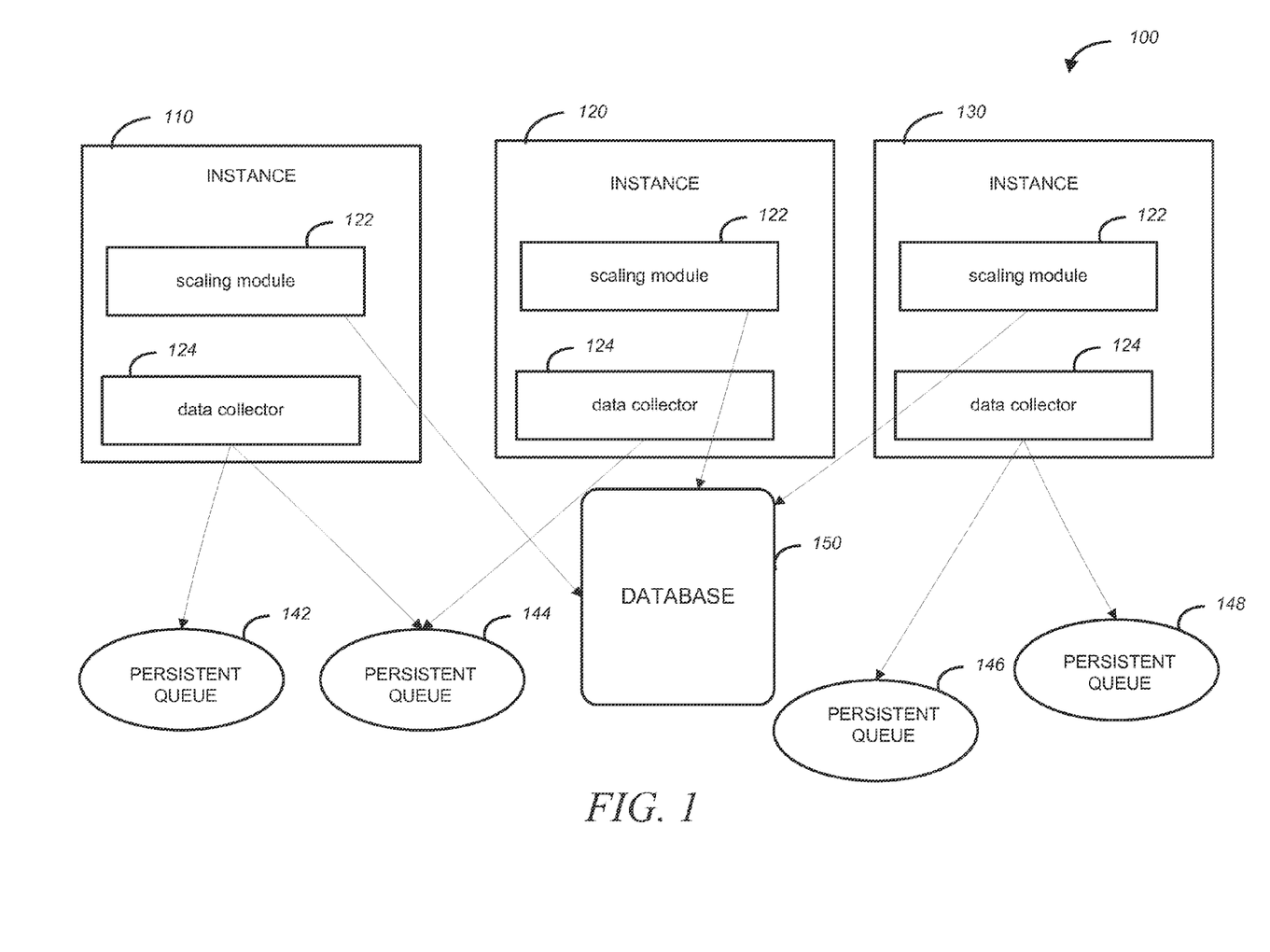
FIG. 1 is a diagrammatic representation of virtual instances interacting with persistent queues and a database, in accordance with an example embodiment.

With reference to FIG. 1, an auto-scaling component comprises a data collector 124 and a scaling module 122 that together manage the auto-scaling of instances executing a cloud-based computing application (e.g., a content server or some other web application). For the purposes of this description, a cloud-based computing application executing on the instances 110, 120, and 130, for which the scaling decisions are being made, is referred to as the subject computing application. The data collectors 124 and the scaling modules 122, which are shown in FIG. 1 as executing on instances 110, 120, and 130, interact through a set of persistent queues 142, 144, 146, and 148, and through a common database 150. In one embodiment, the persistent queues 142, 144, 146, and 148 and the database 150 are managed by the provider of cloud-based computing services (also referred to as the cloud provider) and are expected to have high reliability and availability.

FIG. 1 is a diagram of an overall architecture 100 of a cloud-scale system comprising instances 110, 120, and 130, within which application-level auto-scaling with respect to the subject computing application e.g., a content server, not shown) may be utilized.

As shown in FIG. 1, the scaling modules 122 do not access any of the persistent queues 142, 144, 146, or 148 directly.

The persistent queues 142, 144, 146, or 148 comprise one or more input queues and one or more output queues. In one embodiment, the scaling modules 122 use the database 150 for synchronization and coordination. As the load with respect to the instances 110, 120, and 130 changes, it may be advantageous to run more or fewer instances. The approach described herein uses a distributed architecture, where the scaling module 122 executing in each virtual instance makes its own decisions about whether to terminate the instance that hosts it or to add one or more instances. The database 150 may be utilized to perform coordination with the scaling modules 122 executing in the other virtual instances. As mentioned above, the persistent queues 142, 144, 146, and 148, as well as the database 150, may be managed by the provider of cloud-based computing services. Alternatively, the persistent queues 142-148, or the database 150, or both may be provided by a third party provider.

In one example embodiment, each data collector 124 has two methods: the request latency detector and pending requests estimator. The request latency detector accesses the next pending request in an input queue, processes it, and returns the latency of this recently processed request. The pending requests estimator returns the estimated value of the number of current pending requests. In some embodiments, the number of pending requests for the subject computing application may be estimated by examining the length of the relevant input queue or by examining a count of database records that match a certain query condition or some other computation. These database records that match a certain query condition may be termed, for the purposes of this description, request records.

An instance periodically invokes the request latency detector of the data collector 124 and records the latency value (indicative of the latency of a recently processed request) returned by the request latency detector. The instance may be configured to maintain the history of request latency for the subject computing application between the times when the scaling module 122 wakes up and performs its task of making a scaling decision. The combination of past request latency and approximate pending requests information provides useful retrospective and prospective load information that is application-specific. This combination provides a good measure of the past and future workload with respect to the subject computing application executing in the instance.

The scaling module in each instance wakes up periodically and performs a scaling action. The scaling operation may be described as involving two parts: (1) making a "scaling decision," and (2) performing the "scaling actions," in one embodiment, the code for performing scaling operations, the executable code for the scaling module is stored in the database 150 and is loaded into the instance when the instance starts. The data collector 122 passes the request latency information and the "approximate pending" to the scaling module 122. Based on the request latency information and the estimated value of the number of current pending requests, the scaling module 122 makes a scaling decision, which is either to make no change to the number of instances executing the subject computing application, to reduce the number of instances executing the subject computing application by killing the current instance, or to increase the number of instances executing the subject computing application instances by cloning the current instance. After a decision has been made, the action is performed.

In some embodiments, a scaling action may be utilized to change the properties of the instances that are running the subject computing application. For example, where the virtualization service host permits selection of instances with various memory/disk/network configurations, a new instance may be started with a different configuration than the instance that is performing the seating action. The auto-scaling techniques described herein may be utilized beneficially with "spot-pricing" mechanism in order to "bid" on instances at prices considerably below the "normal rate."

In some embodiments, the database 150 may be utilized to provide synchronization among multiple scaling modules 122 that are configured to perform scaling actions with respect to instances executing the subject computing application. For example, before attempting to alter the number of instances executing the subject computing application, the scaling module 122 locks a row associated with the subject computing application (or, e.g., with the data collector 124) in the database 150 and verifies that no other scaling module 122 executing on another instance has performed a modification within a certain time period that may be termed "courtesy interval." The use of a "courtesy interval" is intended to help avoid the so-called "lemmings off a cliff" behavior, where all the scaling modules 122 may simultaneously decide to terminate their associated instance or to clone their associated instance. Thus, if the scaling module 122 determines, based on the examination of information stored in the database 150, that another scaling module 122 has performed a scaling action with respect to instances executing the subject computing application during the courtesy interval, the current scaling action is discarded and the scaling module 122 releases the lock on the database row. If, on the other hand, no other scaling module 122 has performed a scaling action within the courtesy interval, the scaling module 122 attempts to perform the scaling action.

In some embodiments, the scaling actions are idempotent, that is an untimely crash of the instance, while the scaling module 122 is attempting to perform a scaling action, is made recoverable.

If the scaling action is to terminate an instance, the scaling module 122 writes to the database that the current instance is being terminated, releases the database lock, and then attempts to terminate the current instance. The specific operations to terminate an instance may be specific to the particular virtualization service that is providing the cloud. A so-called "grim reaper" service may be provided, that periodically scans the database and terminates any instances that are marked as terminated but are still executing. The "grim reaper" service may be implemented as part of the subject computing application or, alternatively, it can be provided by the cloud provider or by any party.

If the scaling action is to clone an instance, the scaling module 122 generates a request id and associates it with the "create" request. The virtualization service provider is configured to execute only one "create" request associated with each request id, regardless of how many times it is attempted. In one embodiment, scaling module 122 generates a request id, writes the request together with the "create" request id in the database 150, attempts to execute the "create" request, and writes information about the resulting new instance into the database 150. A so-called "birth helper" service may be provided, that periodically scans the database 150 to detect any "create" requests that might not have been completed and attempts to complete them by resubmitting them and updating the instance information when they eventually complete. The "birth helper" service may be implemented as part of the subject computing application or, alternatively, it can be provided by the cloud provider or by any party. The scaling module 122 together with the data collector 124 may be referred to as an auto-scaling component.

Figure 2:
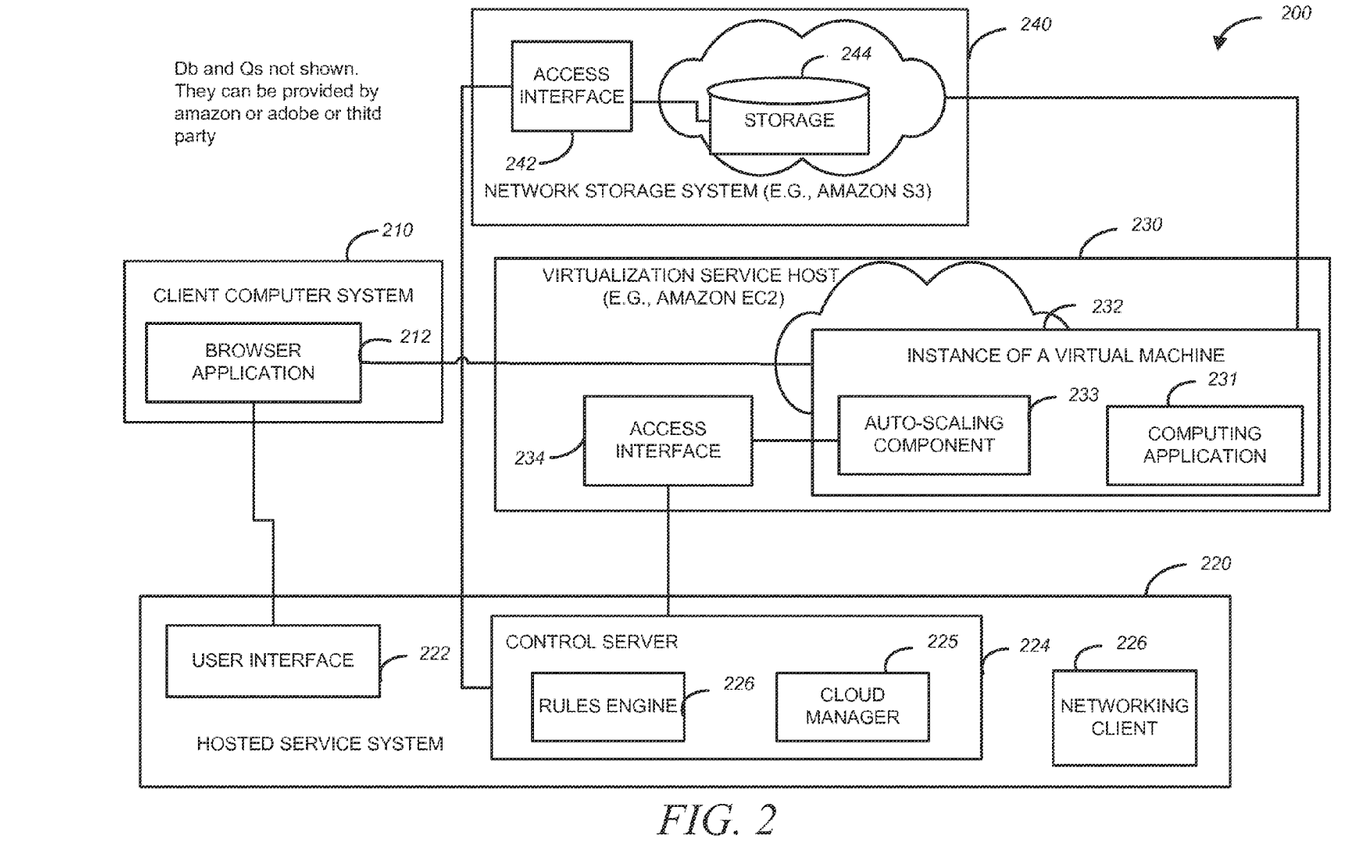
FIG. 2 is a block diagram showing an architecture within which a method and system to provide application-level auto-scaling in a cloud computing environment may be implemented, in accordance with an example embodiment.

An example architecture, within which method and system to provision, on a cloud, a computing application and an associated service provider interface may be implemented, is described with reference to an architecture diagram illustrated in FIG. 2. The architecture 200 may include a client computer system 210 and a hosted service system 220. In one example embodiment, the hosted service system 220 is to provision and manage an enterprise SaaS product utilizing a cloud-based computing service as a virtualization infrastructure. Cloud-based computing services, as shown in FIG. 2, are provided by a virtualization service host 230 and a network storage service 240. In one embodiment, a hosted service system 220 utilizes Amazon Elastic Compute Cloud (EC2) service as a virtualization service and Amazon Simple Storage Service (Amazon S3) as a network storage service. In some embodiments, the hosted service system 220 may utilize more than one virtualization service host, e.g., one host being Amazon EC2 and another host provided by Adobe Systems Incorporated. The client computer system 210 and the hosted service system 220 may be in communication with each other via a communications network that may be a public network (e.g., the Internet).

The virtualization service host 230 accesses the storage 244 of the network storage system 240 to obtain one or more machine images in order to load the instance of a virtual machine 232 executing a computing application 231. As shown in FIG. 2, the instance of a virtual machine 232 is also hosting an auto-scaling component 233. The auto-scaling component 233 may be implemented, e.g., as part of the computing application 231 or independent of the computing application 231. The auto-scaling component 233, in one example embodiment, corresponds to the combination of the data collector 124 and the scaling module 122 of FIG. 1.

While in some embodiments the computing application 231 and the auto-scaling component 233 may be loaded from the same machine image, in other embodiments the computing application 231 and the auto-scaling component 233 are loaded from different machine images.

The computing application 231 may be accessed by the client computer system 210 via a browser application 212. A user in control of the client computer system 210 may send a request to the hosted service system 220 to load the computing application 231. The request may be initiated via a user interface 222 provided by the hosted service system 220 to the client computer system 210 via the browser application 212.

The user interface 222, in one embodiment, provides both an end-user's and a system administrator's view of the computing application 231 and also permits issuing control operations to the computing application 231 and permits viewing the resulting changes in the state of the computing application 231. For example, where the computing application 231 is a content server, an end-user may manipulate various electronic forms. The user interface 222 may also serve as a source of information for the hosted service system 220, including documentation, downloads, and support. The user interface 222, in one embodiment, uses Adobe® Flex® software, offered by Adobe Systems Incorporated, as the user interface technology for the implementation of the user interface. The user interface 222, in one embodiment, uses an XML (Extensible Markup Language)-based representational state transfer (REST) style secure communications protocol to synchronize its operations with a control server 224. A request to access the user interface 222 may be authenticated using one of a variety of authentication techniques.

The request from the client computer system 220 to load the computing application 231 is received at the control server 224, which responds the request by activating an access interface 234 provided by the virtualization service host 230. The control server 224, in one example embodiment, provides coordination between the components of the architecture 200, provides administration and monitoring of the virtualization service host 230, and also may be configured to audit system usage and resource allocation with respect to the computing application 231. The control server 224, in one embodiment, runs within a standard Hypertext Transfer Protocol Secure (HTTPS)-compliant web server and may be deployed as a publically accessible web application that is available outside a firewall.

The virtualization service host 230 accesses the storage 244 of the network storage system 240 to obtain one or more machine images in order to load the associated computing application 231. As mentioned above, in some embodiments, the executable code that is the auto-scaling component 233 may be loaded separately from the machine image comprising the computing application 231. The machine images can be uploaded to the network storage system by the control server 224 utilizing an access interface 242 provided with the network storage system 240. The hosted service system 220 further includes a secure networking client 226 to provide a bidirectional, encrypted, compressed connection between a machine in the end-user's secure network environment (e.g., the client computer system 220) and one or more instances of a virtual machine running within the virtualization infrastructure (the computing application 231). The networking client 226 manages various aspects of transmission control protocol (TCP) traffic forwarding, encryption, and network discovery, such that the user can access the computing application 231 as if it was running locally on the user's machine. An example auto-scaling component is illustrated in FIG. 3.

Figure 3:
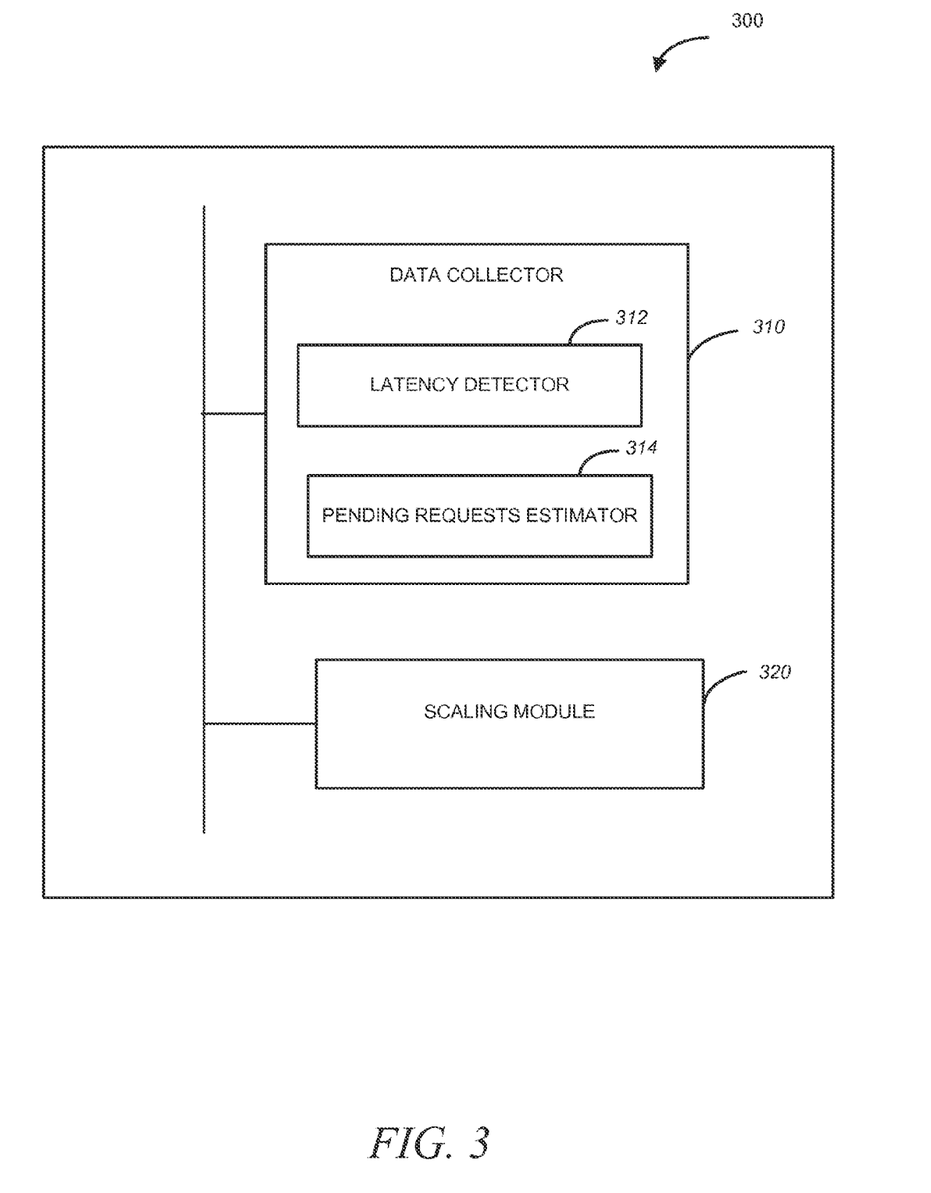
FIG. 3 is block diagram of a system to provide application-level auto-scaling in a cloud computing environment, in accordance with one example embodiment.

FIG. 3 is a block diagram of a system 300 that corresponds to the auto-scaling component 233 shown in FIG. 2, in accordance with one example embodiment. As shown in FIG. 3, the system 300 includes a data collector 310 and a scaling module 320. The data collector 310 may be configured to collect, using at least one processor coupled to a memory, application-level data. The application-level data reflects demand for a subject computing application executing on the virtual instance of a machine provided by a virtualization service, such as, e.g., Amazon EC2.

The scaling module 320 may be configured to select a scaling action based on the application-level data provided by the data collector 310, and issue a request to the virtualization service to perform the scaling action with respect to the virtual instance of a machine. The scaling action may be terminating the virtual instance of the machine that hosts the auto-scaling component or instantiating a new virtual instance of a machine executing the subject computing application. It will be noted that, while the scaling module 320 can issue requests to terminate or create a virtual instances, the scaling module 320 may also be configured to execute scaling actions, such as terminating or creating virtual instances of a machine.

As explained above, application-level data comprises latency of a recently processed request directed to the subject computing application and an estimate of the number of pending requests directed to the subject computing application. The number of pending requests directed to the subject computing application may be based on a length of an input queue provided by the virtualization service. The number of pending requests directed to the subject computing application may also be determined based on a number of request records in a database provided by the virtualization service. The data collector 310 may include a latency module 312 configured to determine latency of a recently processed request directed to the subject computing application. The data collector 310 may also include a pending requests estimator 314 configured to estimate the number of pending requests directed to the subject computing application.

The scaling module 320 may be configured to create a new virtual instance of a machine that has properties that differ from the properties of its host instance. For example, if the application-level data provided to the scaling module 320 by the data collector 310 indicates that the need for creating a new instance is not urgent (e.g., the number of pending requests is within a certain range and/or the latency value is within a certain range), the scaling module 320 may access a recent price/bid history for instances having various configuration and submit a bid for creating an instance with certain parameters at a certain price. If the virtualization service returns a message indicative of accepting the bid, the scaling module 320 creates a new instance. Otherwise, no new instance is created, as long as the application-level data indicates that a new instance does not to be created urgently. In some embodiments, the scaling module 320 may access a price list for instances with different configuration parameters and select a configuration based on the application-level data provided by the data collector 310.

The scaling module 230 may be configured to lock a database row associated with the subject computing application, and, based on whether a scaling action with respect to the subject computing application has been performed during a predetermined time interval, proceed with the scaling action or cancel the scaling action. An example method for application-level auto-scaling in a cloud computing environment can be described with reference to FIG. 4.

Figure 4:
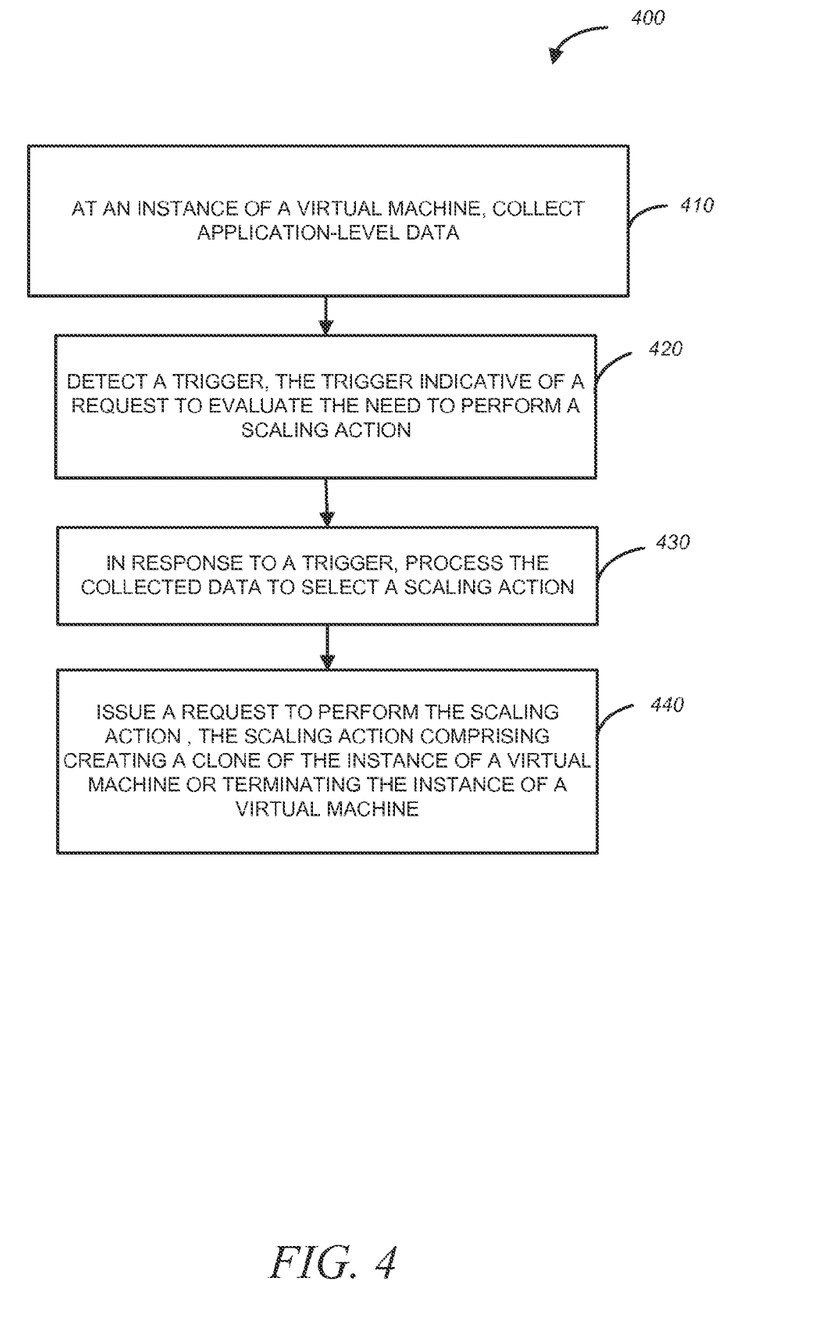
FIG. 4 is a flow chart of a method to provide application-level auto-scaling in a cloud computing environment, in accordance with an example embodiment.

FIG. 4 is a flow chart of a method 400 for application-level auto-scaling in a cloud computing environment, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides, at least partially, at the system 300 shown in FIG. 3.

As shown in FIG. 4, the method 400 commences at operation 410, when the data collector 310 of FIG. 3 collects application-level data. As mentioned above, a scaling module (e.g., the scaling module 122 of FIG. 1 or the scaling module 320 of FIG. 3) wakes up periodically and performs its task of making a scaling decision. At operation 420, a trigger indicative of a request to evaluate the need to perform a scaling action is detected. Such trigger may be to wake up the scaling module 320. At operation 430, the scaling module 320 processes the application-level data collected by the data collector 310 and determines/selects a scaling action. At operation 440, the scaling module 320 issues a request to execute the determined scaling action.

Figure 5:
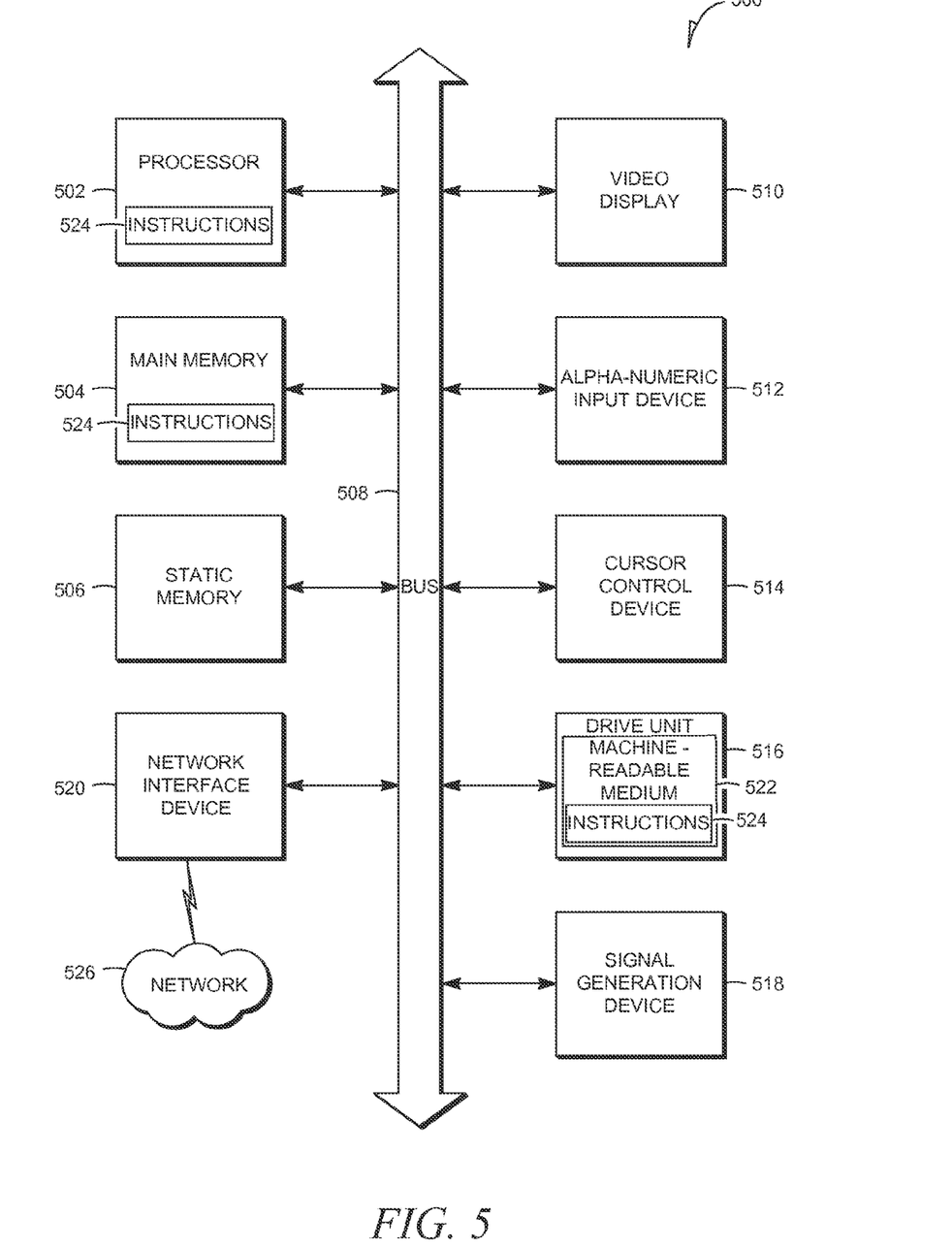
FIG. 5 is a diagrammatic representation of an example machine in the form of a computer system within which a set of instructions, for causing the machine to perform any one or more of the methodologies discussed herein, may be executed.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (LD) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually, or collectively, by the term "invention" merely for convenience and without intending to voluntarily limit the scope of this application to any single invention or inventive concept if more than one is, in fact, disclosed.

Thus, a method and system for providing application-level auto-scaling in a cloud computing environment has been described. Although the method and system have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:

a virtual instance of a machine provided within a virtualization service, collecting application-level data, the application-level data reflecting demand for a subject computing application executing on the virtual instance of the machine, wherein the subject computing application executes on a plurality of virtual instances each having a corresponding scaling module that performs scaling decisions;

selecting, via the virtual instance of the machine, a scaling action based on the application-level data using at least one processor coupled to a memory;

locking a database row within a database, the database row associated with the subject computing application;

verifying that another scaling module executing at another virtual instance within the plurality of virtual instances has not performed the scaling action within a predetermined time period based on information stored in the database; and issuing a request to perform the scaling action with respect to the virtual instance of a machine, the scaling action comprising terminating the virtual instance of the machine or instantiating a new virtual instance of the machine, the new virtual instance of the machine executing the subject computing application.

2. The method of claim 1, wherein the collecting of the application-level data comprises determining latency of a recently processed request directed to the subject computing application.

3. The method of claim 1, wherein the collecting of the application-level data comprises determining a number of pending requests directed to the subject computing application.

4. The method of claim 3, wherein the determining of the number of pending requests directed to the subject computing application comprises examining an input queue provided by the virtualization service.

5. The method of claim 1, the method comprising:
accessing a price list for instances having various configuration;
selecting a configuration from the price list based on the application-level data; and
creating a new virtual instance of the machine executing the subject computing application, the new virtual instance having the selected configuration.

6. The method of claim 1, the method comprising:
in response to determining that the application-level data indicates a non-urgent need for a new virtual instance of the machine executing the subject computing application:
accessing a recent price/bid history for instances having various configuration,
submitting a bid for creating the new virtual instance of the machine having certain parameters at a certain price, and
creating the new virtual instance in response to a message indicative of the virtualization service accepting the bid.

7. The method of claim 1, the method comprising:
generating, at the virtual instance of the machine, a request identification;
including the request identification with the request to perform the scaling action;
receiving, at the virtualization service, the request to perform the scaling action; and
canceling the scaling action if a request to perform a scaling action is associated with the request identification that has already been processed.

8. The method of claim 1, the method comprising:
scanning the database that stores data related to execution of the subject computing application to detect an indication that the virtual instance of the machine is to be terminated and was not terminated; and
terminating the virtual instance of the machine.

9. The method of claim 1, the method comprising:
scanning the database that stores data related to execution of the subject computing application to detect an indication that a new virtual instance of the machine executing the subject computing application is to be created and was not created; and
creating the virtual instance of the machine.

10. A system comprising:

a memory;

at least one processor coupled to the memory;

a data collector to collect, using the at least one processor, at a virtual instance of a machine provided within a virtualization service, application-level data, the application-level data reflecting demand for a subject computing application executing on the virtual instance of the machine, wherein the subject computing application executes on a plurality of virtual instances each having a corresponding scaling module that performs scaling decisions; and a scaling module within the virtual instance of the machine to:

select a scaling action based on the application-level data, lock a database row within a database, the database row associated with the subject computing application;

verify that another scaling module executing at another virtual instance within the plurality of virtual instances has not performed the scaling action within a predetermined time period based on information stored in the database, and issue a request to perform the scaling action with respect to the virtual instance of the machine, the scaling action comprising terminating the virtual instance of the machine or instantiating a new virtual instance of the machine, the new virtual instance of the machine executing the subject computing application.

11. The system of claim 10, wherein the application-level data comprises
latency of a recently processed request directed to the subject computing application.

12. The system of claim 10, wherein the application-level data comprises a number of pending requests directed to the subject computing application.

13. The system of claim 12, wherein the number of pending requests directed to the subject computing application is based on a length of an input queue provided by the virtualization service.

14. The system of claim 10, wherein the scaling module is to:

access a price list for instances having various configuration;

select a configuration from the price list based on the application-level data;
and create the new virtual instance of the machine executing the subject computing application, the new virtual instance having the selected configuration.

15. The system of claim 10, wherein the scaling module is to:
- in response to determining that the application-level data indicates a non-urgent need for the new virtual instance of the machine executing the subject computing application:
- access a recent price/bid history for instances having various configuration, submit a bid for creating the new virtual instance of the machine having certain parameters at a certain price, and
- create the new virtual instance in response to a message indicative of the virtualization service accepting the bid.

16. The system of claim 10, wherein the scaling module is to:
- generate, at the virtual instance of a machine, a request identification;
- include the request identification with the request to perform the scaling action, wherein the request to perform the scaling action is to be denied if a request to perform a scaling action associated with the request identification that has already been processed.

17. The system of claim 10, comprising:
- the database that stores data related to execution of the subject computing application; and
- one or more input queues to queue requests directed to the subject computing application.

18. A machine-readable non-transitory storage medium having instruction data to cause a machine to:
- collect, using the at least one processor, at a virtual instance of a machine provided within a virtualization service, application-level data, the application-level data reflecting demand for a subject computing application executing on the virtual instance of the machine, wherein the subject computing application executes on a plurality of virtual instances each having a corresponding scaling module that performs scaling decisions;
- select, at the virtual instance, a scaling action based on the application-level data;
- locking a database row within a database, the database row associated with the subject computing application;
- verify that another scaling module executing at another virtual instance within the plurality of virtual instances has not performed the scaling action within a predetermined time period based on information stored in the database; and
- issue a request to perform the scaling action with respect to the virtual instance of the machine, the scaling action comprising terminating the virtual instance of the machine or instantiating a new virtual instance of the machine, the new virtual instance of the machine executing the subject computing application.

* * * * *